United States Patent [19]

Torterotot

[11] 4,329,829
[45] May 18, 1982

[54] METHOD FOR STERILIZING A THERMO-PLASTIC STRIP USED FOR THE HOT-FORMING OF STERILE CONTAINERS AND STERILE PACKAGING INSTALLATION USING THE SAID METHOD

[75] Inventor: Roland Torterotot, Longvilliers, France

[73] Assignee: Pak Pro International N.V., Willemstad, Netherlands Antilles

[21] Appl. No.: 135,666

[22] Filed: Mar. 31, 1980

[30] Foreign Application Priority Data

Jan. 17, 1980 [FR] France .................. 80 01030

[51] Int. Cl.³ .................. B65B 55/08; B65B 55/06
[52] U.S. Cl. .................. 53/426; 422/1; 422/22; 493/467
[58] Field of Search .................. 422/1, 22; 53/425, 426; 493/5, 29, 196, 467; 219/10.55 M, 10.61 R, 10.71, 148, 162, 201, 388, 478

[56] References Cited

U.S. PATENT DOCUMENTS

| | | | |
|---|---|---|---|
| 3,383,831 | 5/1968 | Goldsmith et al. | 422/1 X |
| 3,413,433 | 11/1968 | Timmermans et al. | 219/10.61 |
| 3,466,850 | 9/1969 | Hudsun et al. | 422/22 X |
| 3,911,642 | 10/1975 | Ernstsson et al. | 422/22 X |
| 4,155,786 | 5/1979 | Corbic | 422/1 X |

FOREIGN PATENT DOCUMENTS

| | | |
|---|---|---|
| 1180118 | 10/1964 | Fed. Rep. of Germany . |
| 1198791 | 12/1959 | France . |
| 2286698 | 4/1976 | France . |
| 2335404 | 7/1977 | France . |
| 421497 | 3/1967 | Switzerland . |

OTHER PUBLICATIONS

Kelsey R. J., "Aseptic-Packaging-Machine Design", *Modern Packaging*, 2/74 pp. 37-40.

Hoger, A, "Infrarotstrahler zur Erwarmung von Thermoplastichem Halbzeug", *Kunststofftechnik*, vol. 13, No. 6, 1974, pp. 118-121.

*Primary Examiner*—Barry S. Richman

[57] ABSTRACT

A method for sterilizing a thermoplastic strip moving forward stepwise and used in the production of hot-formed containers which, after forming, are filled and sealed in a sterile atmosphere, which method consists, before the strip softening operation, in exposing the surface of said strip which is subsequently to constitute the inside face of the containers, evenly and intermittently, in successive portions and for a very short period of time, to a temperature higher than that of the softening point of the said thermoplastic strip and which is dependent on the desired extent of bacterial destruction.

11 Claims, 6 Drawing Figures

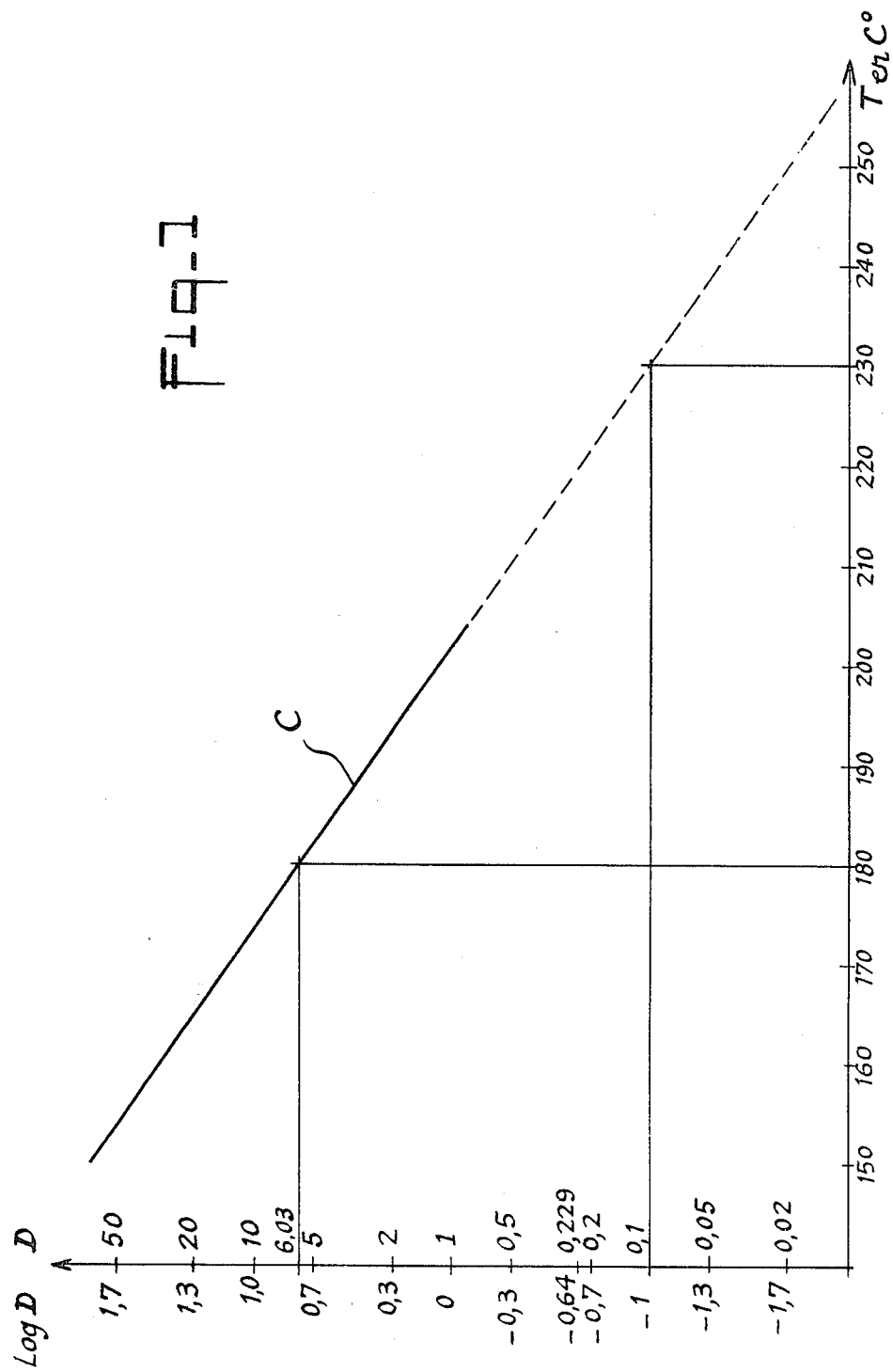

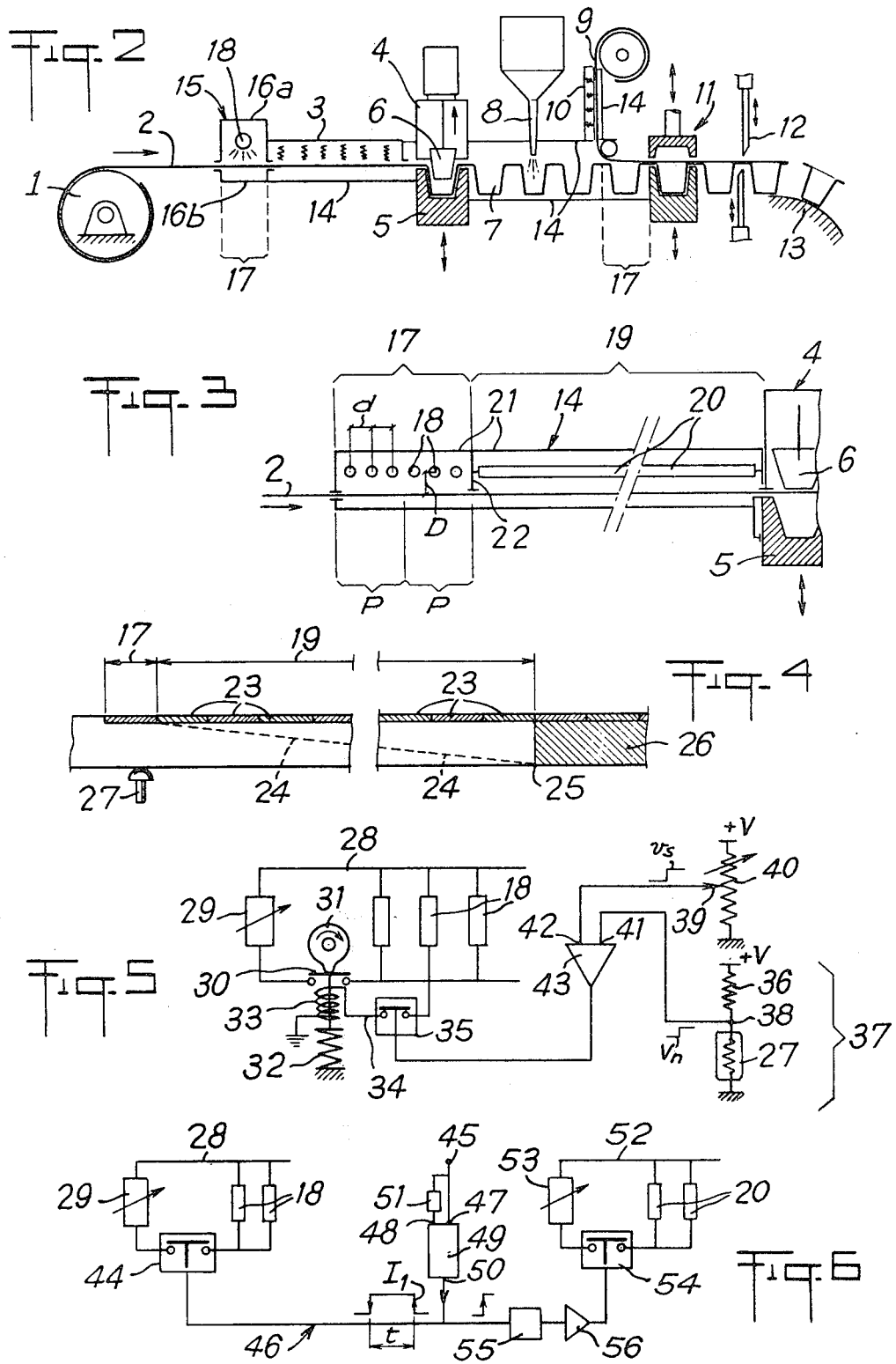

METHOD FOR STERILIZING A THERMO-PLASTIC STRIP USED FOR THE HOT-FORMING OF STERILE CONTAINERS AND STERILE PACKAGING INSTALLATION USING THE SAID METHOD

The present invention relates to a method and apparatus for sterilizing the surface of a thermoplastic strip by heat treatment at a temperature higher than its softening point, which strip is used in the production of hot-formed containers filled with a substance and sealed in a sterile atmosphere as well as to a packing installation making use of the said method and apparatus.

A method for sterilizing a thermoplastic strip is already known which consists in subjecting the said strip to a heat treatment at a predetermined temperature or at temperatures decreasing over predetermined periods, in keeping the thermoplastic strip in a sterile atmosphere and later the hot-formed containers whilst these are being filled and until they are sealed off. Heretofore, the said heat treatment was effected inside the enclosure of a heating chamber comprising resistors radiating directly towards the thermoplastic strip or embedded in a contact plate coated with a layer of plastic material such as PTFE and permitting to bring the said strip to the softening temperature appropriate to the subsequent hot-forming. The dwell time of the thermoplastic strip inside the heating chamber enclosure should be quite long if one wants to obtain not too bad or too insignificant a sterilization at the softening temperature of the thermoplastic material used. This necessitates the use of a very long heating chamber which is quite incompatible with the requirements of an installation for sterile and compact packaging.

In such installations of compact and sterile packaging of the type wherein the containers are formed from a thermoplastic strip, and wherein the said containers are filled and sealed off, said containers as well as the thermoplastic strip to which they remain attached until they are cut out, are moved forward stepwise so that the softened strip is also subjected to acceleration and deceleration forces. In order to prevent these forces from having too bad an effect on the strip which can have widths exceeding fifty centimeters, said strip is supported either by transport chains (French Pat. No. 2 028 765) or by an endless support belt extending over the whole width of the thermoplastic strip (French Pat. No. 2 335 404).

In order to prevent the formation of pockets without having to provide other support means than the lateral transport means, it has already been proposed to heat, by direct contact, up to the softening temperature, only those parts of the strip that will subsequently constitute the base and side wall of the containers, and to leave at a lower temperature, the parts meant to consititute the rims of the containers. A grid of material is thus obtained in the thermoplastic strip which is mechanically stronger but which is not sterile or which requires a longer heat treatment hence a further lengthening of the heating chamber.

It is a known fact that a good and efficient sterilization requires high temperatures able to reach 250° C. or over (French Pat. No. 1 198 791). In this case the strips of thermoplastic material need to rest on a support and to be very much cooled down on the side opposite that which is exposed to the heat, so as to avoid a deterioration of the thermoplastic strip. This manner of proceeding means a considerable waste of energy and cannot be applied to the hot-forming of containers.

It was noted that certain bacteria or other polluting organisms are not destroyed by the heat treatment known to be used for softening the thermoplastic strip prior to hot-forming, so that the said organisms develop after the containers have been filled with a substance, such as for example a food substance, and rapidly contaminate the said product despite the sealing off of the said containers. It was found that the time needed for softening the thermoplastic strip is shorter than that needed for sterilizing the said strip at the softening temperature and that the said strip becomes uncontrollably deformed when it is kept at the softening temperature throughout the time needed for the sterilization.

The present invention eliminates these disadvantages and its object is to propose, within a sterile packing installation, a product and a device for sterilizing the surface of a thermoplastic strip which guarantees an effective sterilization without for all that having to heat the said strip too long through its entire thickness at its softening temperature or above.

For the sterilizing method, this object is attained due to the fact that, prior to the container hot-forming, filling and sealing operations in a sterile enclosure and preferably before the strip softening operation, the surface of said strip which is subsequently to constitute the inside face of the containers is exposed, evenly and intermittently, in successive portions and for a very short period of time, to a temperature higher than that of the softening point of the said thermoplastic strip and which is dependent on the desired extent of bacterial destruction. If necessary, the sterilizing heat application time can be worked out, with a heat probe in contact with the said strip in the zone considered, as a function of the temperature reached on the level of the probe. Advantageously, the very short period of sterilizing treatment is at the most equal to the stopping time of the strip between two successive steps forward of the said thermoplastic strip.

With this design, the heat energy needed for the sterilization is rapidly transmitted to only the surface of the thermoplastic strip, over a maximum thickness of about 1/10th of a millimeter, accounting, if necessary, for the initial temperature of the strip, and so that only that surface which will be constituting the inside face of the container is brought to a high temperature which will destroy all polluting organisms without the thermoplastic strip actually melting, burning up or being damaged in any way. It is advantageous to effect the sterilizing treatment before the thermoplastic strip softening operation in a heating chamber of known design, because then, the colories brought by the sterilizing treatment also serve partly to softening the strip. However, it is obvious that the sterilizing treatment can also be effected after the softening operation preliminary to the hot-forming. To avoid any further pollution of the sterilized face of the thermoplastic strip, it suffices then to keep the said sterilized face in a sterile atmosphere until the containers are sealed off.

It was found in laboratories that the sterilizing time, i.e. the heat treatment period t expressed in seconds and needed to destroy $10^n$ bacteria with dry heat is, for a given temperature T, equal to the product of the exponent n with basis 10 of the number of bacteria to be destroyed by the value D read on the diagram ($t = n \times D$) shown in FIG. 1.

Because, in some cases, the temperature reached is measured by heat probe, either on the surface of the thermoplastic strip which is subsequently destined to constitute the inside face of the containers, or preferably on the opposite surface, it is equally possible and feasible to account for the thickness of the thermoplastic strip and for the coefficient of heat conductivity of the material constituting the strip. It is also important, according to the present invention, to be able to interrupt the action of the sterilizing heat treatment, immediately upon the response of the heat probe.

Taking all these factors into account as well as the technical teaching given by the invention, it is possible, for a given sterilizing temperature which will be applied evenly over the surface of the thermoplastic strip to be treated, to assess the minimum time required to destroy a predetermined number of bacteria. This assessment can be made for example with the reference organism *bacillus subtilis* var. *niger*, which is the bacterium most resistant to heat and belonging to the mesophile group which is the group of bacteria and organisms mostly found in food products.

On the accompanying drawings is shown a diagram which forms an integral part of the invention and which, for a given treatment temperature in Celsius degrees, gives the necessary value D in seconds to obtain a 90% reduction of the present spores, the minimum treatment period t for a number $10^n$ of spores being that resulting from the product of the exponent n by the value of D in seconds as shown on the diagram. It is considered that the superficial sterility is acceptable starting from $n=3$ and that it is very good when $n=6$.

The said diagram explains how in a known heating chamber working for example at a temperature of 130° C., the minimum dwell time in seconds of the thermoplastic strip should be at least of the order of $n \times D$, for $10^n$ spores to be destroyed. When taking a very low value for n, such as 3 for example, one obtains with the diagram, Log $D=2.51$; $D=325$ and $t=3 \times 325=975$ seconds, which means over 16 minutes. This explains why heating chambers cannot be used for an efficient sterilization.

Advantageously, the intermittent heat treatment, at high temperature over a short period, of the surface of the thermoplastic strip is achieved by heating radiations, the radiation temperature being such that it can bring the surface of the said strip up to a temperature of at least 180° C. and keep it so throughout the time imparted for the sterilizing heat treatment and not exceeding five seconds per treatment period. Of course, temperatures of 230° C. and over are also possible provided that the intermittent heat treatment is interrupted exactly at the predetermined moment, the latter being detected for example by the heat probe in contact with the thermoplastic strip, because with such high temperatures, the risk of burning and damaging the thermoplastic strip is very great. It is consequently advantageous to use resistors without any noticeable heat inertia which can reach the operational temperature in less than 1/10th of a second.

By extrapolating the accompanying diagram, it is noted that for a temperature T equal to 202° C., the value of D is of the order of 1 second, and for a temperature T equal to 230° C., the value of D is of the order of 0.1 second. Consequently the dry sterilization periods at high temperatures (180° C. to 230° C. and over) are very short, even when the value of n (degree of sterilizing efficiency) is high (at least equal to 6).

Thus, in an installation for the sterile packaging of products of the type F.F.S. (form-fill-seal), for a degree of sterilizing efficiency $n=6$, the dry sterilization periods are at least equal to 6 seconds for $T=202°$ C. and to 0.6 second for $T=230°$ C.

It will be understood how, in a packaging installation with a high rate of working cycles, for example 30 cycles per minute, there are 2 seconds left per cycle, of which 1.5 seconds are allocated to stopping and 0.5 second to a one-step forward movement or transfer of the thermoplastic strip. To ensure the dry sterilization of one specific zone (surface determined by the width of the strip and the length of one to three steps forward—one step forward corresponding to the width of one or more containers taken in the forward direction of the thermoplastic strip—) a temperature T will be selected which, depending on the desired degree of sterilizing efficiency n, will make it possible to achieve the dry sterilizing of the zone in question for the lapse of time in which the strip has stopped between two steps forward. In view of the risks of burns and damages to the thermoplastic strip, which risks increase exponentially with the increase in temperature, it is preferable for the treatment temperatures not to exceed 230° C. and to double or treble the sterilizing treatments by giving to the zone to be treated by dry sterilization treatment a length corresponding to two or three steps forward. For example, for a sterilization temperature of 210° C., one obtains $D=0.5$ so that for $n=6$ the sterilizing treatment period t is equal to 3 secs. Consequently, when the strip is stationary, it has to be subjected to a sterilizing treatment for twice 1.5 seconds, and thus give the area to be treated a length equivalent to two steps forward.

The heat probe is preferably associated to the inside face of the thermoplastic strip, i.e. to the face which is not directly exposed to the action of the sterilizing heat rays and so which is not sterilized. The temperatures detected by the heat probe are dependent on the heat conductivity coefficient and on the thickness of the material constituting the thermoplastic strip, and they will be less than the temperature of the sterilized face. For each thermoplastic strip, the threshold temperature detected by the probe and from which the sterilizing heat resistors are switched off, is determined by experimentation. After having defined a suitable sterilizing temperature, the heat probe can be removed.

To sterilize one face of the thermoplastic strip by successive bursts of heat, it is advantageous to use rod-shaped resistors arranged in parallel and at a very short distance from the thermoplastic strip and extending transversely with respect to the said strip over the whole serviceable width thereof. The distance between the axes of the heat resistors and the upper plane face of the thermoplastic strip is preferably about 5 cm and is selected so that the heat radiation is distributed evenly over the zone to be sterilized.

The distance between the axes of two heating rods is about 2 cm and the distance between the axis of the said heating rods and the adjacent surface of the thermoplastic strip is, as indicated hereinabove, about 5 cm. Short wave transmitters of infrared rays constituted of silica glass tubes with a metallized rear face are used as heating rods. The maximum radiation for these heating rods is found at wavelengths varying between 1.2 $\mu$m and 1.4 $\mu$m. For heating rods with a 50 cm serviceable length and a 1 cm diameter, the maximum heating power is about 3,000 watts. With heating rods of the aforesaid type and with the arrangement indicated, it is possible to apply evenly to the surface of the thermoplastic strip, in the treatment zone considered, a density of heating power of about 25 watts/cm 2.

Although the operating temperature of the elements giving a sterilizing heat can be higher than the temperature at which the material constituting the thermoplastic strip is decomposed, the aforesaid temperature probe will be used to see that the temperature of the sterilizing treatment does not exceed the predetermined value. It is also important for the sterilizing temperature not to be applied to the surface of the thermoplastic strip for a longer period than the preset treatment period. To this effect it is advantageous to connect the switch of the supply circuit of the heating rods to a clock cutting off the circuit as soon as the treatment period has elapsed, the said circuit being switched on after each step forward of the thermoplastic strip, i.e. every time the strip stops.

Obviously, this sterilizing treatment takes place inside a sterile enclosure filled with a sterile atmosphere.

It is also advantageous to use heating rods of the aforesaid type when making the heating chamber used to soften the thermoplastic strip for hot-forming it into containers remaining attached to the said strip.

In such a case, the heating rods are brought to a lower temperature, between 110° C. and 130° C. for a long enough period to allow the softening of the thermoplastic strip through its entire thickness. This is obtained by applying to the heat resistors (or heating rods) a lower voltage than that applied to the heating rods used for the sterilizing treatment.

The advantage of using heating rods of the aforesaid type—which have a low thermal inertia, a strong energy concentration and have a variable power if a variable voltage is applied to them—in heating chambers for softening the thermoplastic material, resides in the fact that they permit to use a sterile enclosure which can be kept in position even when the softening heat has stopped as well as the transport of the thermoplastic strip. Indeed, in the case of a known heating chamber, this has to be moved away from the thermoplastic strip when said strip has stopped moving, in order to avoid its being burnt, because, even though the conventional heat resistors have been switched off, their temperature reduces too slowly due to their great thermal inertia. As a result, the sterility of the enclosure where the heating chamber is situated, is destroyed every time the thermoplastic strip stops, or else the said strip is burnt. In order to leave the heating chamber in position when the said strip has stopped moving, it has already been proposed to interpose right away a screen between the heat resistors and the thermoplastic strip, however the screen comes from a polluted atmosphere and therefore destroys the sterility of the heating chamber.

Due to the use of heating rods of the aforesaid type in heating chambers used for softening the thermoplastic strip, the heat radiated by the said rods reduces very rapidly, after the power supply to the said rods is switched off, to below a value which would risk to damage the thermoplastic strip when this is stopped.

Sterilizing heat resistors and softening heat resistors (i.e. used for softening the thermoplastic strip) situated on the side to be sterilized of the thermoplastic strip can be mounted in the same sterile enclosure, so as to prevent any losses of sterile air or fluid when the thermoplastic strip passes from the sterilizing zone to the strip softening zone. Of course, in the softening zone the thermoplastic strip can be heated on both sides with two heating chambers situated on either side of the said strip.

The object of the present invention relates not only to thermoplastic strips used in the hot-forming of containers, but also to cover strips the surface of which will be placed against the rims of the said containers and therefore should also be sterile. The said cover strips are either entirely made of thermoplastic material when they are to be hot-formed, or partly made of thermoplastic materials when they are flat sealed on the rims of the containers. In this last case, the thermoplastic material of the cover strip is a film adhering to a supporting strip in aluminium for example.

Thereagain, of course, the face to be sterilized of the cover strip traverses a sterile enclosure from the sterilizing zone to the zone where the covers are sealed on the containers.

The invention will be more readily understood on reading the following description of several embodiments forming an integral part of a sterile packaging installation of the F.F.S. type, with reference to the accompanying drawings in which:

FIG. 1 is a diagram showing the known relation between the sterilizing temperature in °C. (abscissa) and the minimum application period D, either in seconds, or in Log D (ordinate), to obtain with the dry heat, a destruction of 90% of bacteria of the type known as *bacillus subtilis* var. *niger*;

FIG. 2 diagrammatically illustrates a sterile packaging installation in which a thermoplastic strip is moved forward in stepwise manner;

FIG. 3 diagrammatically shows a sterile enclosure comprising the sterilizing device and the heating chamber for softening the strip;

FIG. 4 is a diagram of the heating treatments to which is subjected the thermoplastic strip before the hot-forming of the containers;

FIG. 5 is a diagram of a control circuit for controlling the sterilizing heat resistors by means of a temperature probe, and FIG. 6 is a diagram of another circuit for controlling the sterilizing heat resistors without the temperature probe.

The curve C of FIG. 1 represents the curve of the destruction through heat of a strain of *bacillus subtilis* var. *niger* and gives the minimum sterilizing treatment period in seconds for a given temperature in °C. necessary to obtain a given rate of destruction n. For example, for n=6, i.e. for $10^6$ bacteria to be destroyed, at a temperature T=180° C., the time needed to effect the sterilizing treatment will be 6×6.03 (D=6.03 for T=180° C.), i.e. 36.18 seconds. If the stopping time between two successive forward motions is 1.5 seconds, the sterilizing treatment will need to be repeated for 25 stops of the thermoplastic strip or else the sterilizing treatment zone will need to be extended so that its length corresponds to 25 steps forward. This cannot be done, either for space reasons or for fear of the thermoplastic strip collapsing, which strip is supposed to be hot-formed as soon as it has reached the softening temperature through its entire thickness. If on the contrary, a sterilizing temperature of 230° C. is used, one obtains D=0.1 secs, and thus for n=6 a sterilizing treatment period of 0.6 second, so that said treatment can be performed during a stop between two steps forward of the thermoplastic strip.

To avoid any overheating of the strip, it will even be possible to sterilize with a temperature of 220° C., increasing the treatment period in consequence (t=6×0.229=1.374 secs.). This diagram further shows that for a temperature of 210° C. the treatment period is equal to 6×0.5=3 secs. so that the treatment should be performed on the thermoplastic strip for two successive stops and the sterilizing treatment zone should have a length equal to two steps forward.

FIG. 2 diagrammatically shows an installation for the sterile packaging of a sterile product in liquid, paste or powder form. Said installation comprising a reel of thermoplastic strip 1 from which reel is unwound a thermoplastic strip 2 in stepwise manner, a heating chamber 3 comprising a plurality of heating elements intended to bring the material constituting the strip 2 to its softening temperature through the entire thickness of the said strip 2, a hot-forming device 4 with movable mold 5 and punch 6, for producing containers 7, a filling station 8, a cover strip 9 combined with a sterilizing system 10, a sealing device 11, a cutting member 12 for the filled and sealed containers 7 and a discharge ramp 13, a sterile enclosure 14 being provided on either sides of the strip 2 from the heating chamber 3 to upstream of the sealing device 11. The said sterile enclosure 14 also contains the sterilizing system 10 (heating chamber) of the cover strip 9.

Considering that the sterile packaging installations are known in general (see for example U.S. Pat. No. 3,530,641) it will not be necessary to describe them here in detail.

The sterilizing heat device 15 is preferably situated immediately upstream of the heating chamber 3 but it could also be situated between the said chamber 3 and the hot-forming device 4.

The sterilizing heat device 15 comprises an enclosure 16 in two parts 16a and 16b situated on either sides of the area to be treated 17 of the thermoplastic strip 2. In the said enclosure 16 as well as in the enclosure 14, the atmosphere is kept sterile and slightly over-pressurized with respect to pressure prevailing outside, both enclosures 14 and 16 communicating together via the passage provided for the thermoplastic strip 2. Inside the upper part 16a of the enclosure 16 is provided at least one radiating member 18 such as a wire- or rod-shaped resistor which can be brought to a temperature greater than 180° C. and preferably to 200° C., and this virtually instantly. To work the radiating member or heating rods 18, there is provided a controllable source of power which is connected to the heating rods 18 via an electrical supply circuit in which is mounted a switch which is actuated intermittently so that the said rods heat for a very short time, a few seconds only, in relation to the selected parameters of treatment, the zone to be treated 17 of the thermoplastic strip 2 to a temperature greater than the softening point (softening temperature). The dimensions of the zone to be treated 17 with the sterilizing heat correspond, on the one hand, to the width of the strip 2 (with the exception of two small marginal zones) and, on the other hand, in the longitudinal direction of the strip 2, to the length of one to three steps forward of the latter, which step length is determined by the length of the strip portion worked in one operation only of the hot-forming device 4. As already indicated in connection with FIG. 1, the intermittent heat treatment of the successive zones 17 is achieved by using a fixed source of heat 18 and by adapting the treatment temperature to the number of bacteria to be destroyed per zone 17 and to between 1 and 3 cycles of treatment of the strip 2, where the said cycle corresponds to the lapse of time between two forward motions of the strip 2.

Due to the very short duration of the heat application, only a very fine superficial layer of the thermoplastic strip 2 is brought for a given time, to the temperature required to destroy a specific number of bacteria, whereas the remaining thickness of the strip 2 virtually retains its temperature since the thermoplastic material is a very bad conductor of heat. Advantage is therefore taken here of the bad heat conductivity of the thermoplastic material, i.e. the poor capacity of heat penetration, to perform an instant sterilizing heat treatment comparable to a flame treatment to destroy in a sterile atmosphere all polluting organisms existing on the surface of the thermoplastic strip 2, which surface is to become the inside face of the containers 7.

FIG. 3 shows the upstream part of the sterile enclosure 14, which part is situated upstream of the hot-forming device 4 and comprises, above the thermoplastic strip 2, a first zone known as the sterilizing zone and corresponding to the instant sterilizing heat device 15, and a second heating zone known as softening zone corresponding to the heating chamber 3 producing, in continuous operation, a heat energy, i.e. a temperature, which is much lower than that used for the intermittent sterilizing treatment. The heating rods 18 used in the sterilizing zone have the aforesaid characteristics permitting to reach on the surface of the strip 2 a heating power density of 25 watts/cm2. They are placed in parallel together and to the strip 2 and preferably transversely to the forward direction of the said strip 2. The distance d between the axes of the heating rods 18 is about 2 cm and the distance D between the axis of the rods 18 and the strip 2 is about 5 cm. As can be seen in FIG. 3, the length of the sterilizing zone 17 corresponds in the case of this embodiment to two steps forward P of the thermoplastic strip 2, whereas the length of the softening heat zone 19 which connects with the sterilizing heat zone 17 is at least equal in length to that of the sterilizing zone 17 and preferably several times longer, and in any case long enough to bring the thermoplastic strip 2 at the softening temperature through its entire thickness. The heating resistors 20 used in the softening heat zones 19, i.e. in the heating chamber 3, are advantageously of the same type as those used in the sterilizing zone 17, i.e. with instant thermal response. The said resistors or heating rods are arranged in parallel together and to the thermoplastic strip with a distance of about 2 cm between their axes and a distance from the thermoplastic strip of about 5 cm, and extend either in the longitudinal direction (see FIG. 3) or in the transverse direction of the said strip 2. The softening heat resistors 20 are connected in parallel to an adjustable voltage source which is controlled so that the temperature radiated by the resistors 20 is constant and at a value corresponding to the softening temperature of the thermoplastic strip 2 and varying between 110° C. and 140° C.

The top hood 21 of the upstream part of the sterile enclosure 14 is to be noted, said hood 21 which covers up the thermoplastic strip 2 in the sterilizing zone 17 and the softening zone 19 situated upstream of the hot-forming device 4, being, in principle, permanently fitted, but which is all the same designed so as to be instantly removable. The advantage of the permanent fitted top hood 21 is to allow the sterile atmosphere to be kept in that part of the sterile enclosure 17 even during a prolonged stop of the thermoplastic strip 2, during which stop the resistors with instant thermal response 18 and 20 are disconnected and cut off. On the contrary, during the normal operation of the sterile packaging operation, i.e. during the stepwise forward motion of the thermoplastic strip 2, the softening heat resistors 20 are permanently connected to their power source, whereas the sterilizing heat resistors are intermittently connected to their corresponding power source. In order to avoid interaction between the heating zones of different rating 17 and 19, the top hood 21 is provided on the limit separating these two zones 17 and 19 with a vertical insulating screen 22 descending to the level of the thermoplastic strip 2 and which can, at the same time, be used to secure the ends of the softening heat resistors 20.

FIG. 4 diagrammatically shows the heat treatment methods to which is subjected the thermoplastic strip 2. In the sterilizing zone 17, the surface of the thermoplastic strip 2 which will become the inside face of the hot-formed containers, undergoes for a few tenths of a second or a few seconds, once only or several times, a heat radiation at high temperature (between 180° C. and 230° C.), the treatment duration and temperature being dependent on the selected rate of destruction n (n being at least equal to 3). In view of the poor heat conductivity of thermoplastic materials (the coefficients of heat conductivity in kcal/m h °C. being for the polyethylene between 0.26 and 0.35, for the polypropylene between 0.15 and 0.19, for the polystyrene 0.14 and for the polyvinyl chloride between 0.12 and 0.14), the power of penetration of this instant treatment comparable to a flame treatment is very low and does not reach any deeper than 1/10th mm for the very short treatment period.

In the sterilizing zone 17, the surface of the thermoplastic strip 2 thus undergoes the sterilizing treatment over successive superficial zones 23, when it is stopped, between two steps forward of the said strip. Immediately after being subjected to the said sterilizing treatment, the sterilized zone 23 is transferred with the corresponding part of the strip 2 into the softening heat zone 19 where it will stay for a time corresponding to several steps forward and stops, and long enough so that the portion of strip a coming level with the hot-forming device is exactly at its softening temperature through the whole thickness of the strip 2. The curve 24 indicates the progression of the softening temperature into the thickness of the strip 2. It is understood that from the point 25 situated on the lower face of the strip 2, said latter has reached the softening temperature through its entire thickness so that the portion of strip 26 situated downstream of the point 25 is ready for the hot-forming operation.

Beneath the sterilizing zone 17 is provided a heat probe 27 which is applied against the non-sterilized lower face of the thermoplastic strip 2. Depending on the thickness and the nature of the strip 2, said heat probe will detect any temperature which, in time, increases in relation to the coefficient of heat conductivity of the thermoplastic material. It is thus possible to detect with the said heat probe 27 a temperature value which is styled threshold temperature and which corresponds, for the sterilizing temperature to which the upper face of the strip 2 is exposed, to the period of exposure of the said face to the said sterilizing temperature. In other words, the heat probe is used here to determine the period of application of the sterilizing heat treatment and to produce a control signal for the instant interruption of the sterilizing treatment.

FIG. 5 shows the sterilizing heat resistors 18, connected in parallel via a circuit 28, to an adjustable source of power 29 which is adjusted so that the said resistors 18 with instant thermal response, i.e. without any noticeable thermal inertia, radiate a heat of constant temperature varying between 280° C. and 230° C. In the supply circuit 28 is interposed a main switch 30 the turning off of which is controlled, mechanically for example, by a stopcock 31 after each step forward of the thermoplastic strip 2, said stopcock 31 being for example connected to the strip driving means. Consequently, the sterilizing resistors 18 are supplied with power immediately the strip stops. The main switch 30 is held in its off position against the action of a return spring 32 by means of an electro-magnet whose coil 33 is shunt connected on the supply circuit 28 downstream of the main switch 30. In the branch circuit 24 connecting the coil 33 to the supply circuit 28 there is provided a secondary switch 35 whose momentary switching on is controlled from the heat probe 27. Said secondary switch 35 is of the automatic switching-off type, namely that its switching off is controlled by a return spring, not shown. In view of this arrangement, the power supply to the resistors 18 is interrupted immediately the secondary switch 35 is on and causes the switching on of the main switch 30, which latter will be switched off again by the stopcock 31 upon the next stop following a step forward of the strip, thus permitting a new instant switching on of the resistors 18 as long as the secondary switch 35 stays off.

The heat probe 27 forms with a resistor 36 a potential divider 37 connected between the earth and a potential $+V$. The signal $V_n$ taken at the centre point 38 of the said divider 37 has a voltage which is representative of the temperature detected by the probe 27.

An adjustable threshold voltage $V_s$ corresponding to the threshold temperature to be detected by the probe 27 is taken at the sliding contact 39 of a potentiometer 40. The voltages $V_n$ and $V_s$ are applied to the input terminals 41, 42 of a comparator 43 the output of which is connected to the member controlling the secondary switch 35 and which may be an electromagnetic relay. When the voltage $V_n$ reaches the threshold voltage $V_s$, the comparator 43 issues an output signal which controls the momentary switching on of the secondary switch 35. The time elapsing between each switching off of the main switch 30 and the delivery of the output signal of the comparator 43 is equal to the period in which the resistors 18 are on.

FIG. 6 shows another circuit for controlling the sterilizing heat resistors 18 which are connected to the adjustable source of power 29 via the circuit 28 provided with a main switch 44 which switches off when its control member receives a pulse, for example a high-level one, and which switches on when the signal applied to the control circuit is low-level. The pulse $I_1$ is generated by a signal applied to the input terminal 45 of a control circuit 46 and produced by, or corresponding to the stopping of the strip 2 after one step forward. Said stop signal is applied directly to one (47) of the two inputs 47, 48 of a flip-flop 49 and sent from the output 59 thereof, as a positive pulse $I_1$ to the member controlling the main switch 44 which switches off right away, permitting the instant switching on of the resistors. The stop signal is also sent, but with a predetermined delay, to the second input 48 of the flip-flop 49 via an adjustable time-delay circuit of an adjustable monostable multivibrator 51 connected on the one hand to the input terminal 45 and on the other hand to the second input 48 of the flip-flop 49. In response to the delayed stop signal, a low-level appears at the output 59 of the flip-flop 49, this causing the switching on of the switch 44 and thereby placing the resistors 18 off-circuit. The time t elapsing between the rising and descending edges of the pulse $I_1$ is equal to the period of time which an instant sterilizing treatment lasts.

FIG. 6 also shows the heating resistors 20 which are used to soften the strip 2 and also have instant thermal response. Said resistors 20 are connected via a circuit 52 to an adjustable source of power 53 which keeps them permanently at a temperature varying for example between 110° C. and 130° C. and corresponding to the softening point of the thermoplastic strip 2. A switch 54 interposed in the circuit supplying power to the softening heat resistors 20 is normally in the switched off position. Said switch permits to stop the resistors 29 operating in case of a prolonged stop of the strip 2, for example over a period equal to two or three cycles each comprising the time needed to move one step forward and that of the stop of the strip between two successive steps forward. To this effect, the output 50 of the flip-flop 49 is connected to the input of a releasable monostable multivibrator 55 which needs to be released again before the end of a period of two or three cycles. With no such release, the output of the monostable multivibrator 55 issues a signal which, after amplification in an amplifier 56, acts on the switch 54 to open it. Owing to this arrangement, the softening heat resistors 20 can be placed off-circuit automatically from the circuit controlling the sterilizing heat resistors 18.

Similar control circuits can of course be used in the softening and/or the sterilizing heat treatment of the cover strip 9.

What is claimed is:

1. In a process for producing hot-formed containers comprising the steps of moving a strip of thermoplastic material forward stepwise, subjecting said strip to a softening heat treatment, hot-forming containers by drawing said softened strip in a sterile atmosphere, filling said containers in said sterile atmosphere and sealing said filled containers, an improved method for sterilizing the surface of said strip which is subsequently to constitute the inside face of said containers, which method comprises subjecting said surface to a sterilizing heat treatment by exposing said surface evenly and intermittently, in successive portions, to radiation thereby causing the temperature at said surface to become higher than that of the softening point of said thermoplastic material, each portion being continuously exposed to said radiation for at least one time period not exceeding 5 seconds.

2. A method as claimed in claim 1, wherein said sterilizing heat treatment consists of heating said surface to a temperature of from 180° C. to 230° C. for successive time periods and the heat necessary to soften said strip is produced continuously.

3. A method as claimed in claim 1, wherein said sterilizing heat treatment is applied simultaneously to a portion of said strip whose length is at least equal to one step forward and at the most equal to three steps forward of said thermoplastic strip, whereas said softening heat treatment is applied to a portion of said strip whose length is at least equal to three steps forward of said strip.

4. A method as claimed in claim 1, wherein said time of application of said sterilizing heat treatment is controlled with a heat probe.

5. A method as claimed in claim 1, wherein said time of application of said sterilizing heat treatment is controlled with an adjustable time-delay circuit.

6. A method as claimed in claim 1, wherein said softening heat treatment is stopped by way of a control circuit for controlling said intermittent sterilizing heat treatment.

7. A method as claimed in claim 1, wherein for a sterilizing heat treatment period t (expressed in seconds) necessary to destroy $10^n$ bacteria through dry heat, a temperature T is selected between 180° C. and 230° C. and which, for a given exponent n gives a value D read on the diagram of FIG. 1, so that t is at the most equal to 5 seconds ($t = n \times D$).

8. A method as claimed in claim 1, wherein for said sterilizing heat at least, resistors are used which act as short wave transmitters of infrared rays, of which the maximum radiation emission is found at wavelengths varying between 1.2 um and 1.4 um.

9. A method as claimed in claim 1, wherein said sterilizing heat treatment is performed prior to said softening heat treatment.

10. A method as claimed in claim 1, wherein said strip sterilizing heat treatment is applied only when said strip is stopped.

11. A method as claimed in claim 10, wherein said intermittent sterilizing treatment is started off immediately when said thermoplastic strip stops after one step forward.

* * * * *